United States Patent
Wei et al.

(10) Patent No.: US 7,984,533 B2
(45) Date of Patent: Jul. 26, 2011

(54) DUAL-AXIS HINGE MECHANISM

(75) Inventors: Liang Wei, Shenzhen (CN); Jin-Xin Wang, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 81 days.

(21) Appl. No.: 12/482,555

(22) Filed: Jun. 11, 2009

(65) Prior Publication Data
US 2010/0180403 A1  Jul. 22, 2010

(30) Foreign Application Priority Data

Oct. 24, 2008 (CN) .......................... 2008 1 0305174

(51) Int. Cl.
E05D 3/10 (2006.01)
(52) U.S. Cl. .......................................... 16/367; 16/337
(58) Field of Classification Search .................... 16/367, 16/371, 302, 282, 287, 366, 294, 343, 344; 361/679.06, 679.07, 681, FOR. 104; 248/921, 248/278.1
See application file for complete search history.

(56) References Cited

U.S. PATENT DOCUMENTS

| | | | | |
|---|---|---|---|---|
| 6,618,903 B2 * | 9/2003 | Kim | ................................. | 16/337 |
| 6,883,206 B2 * | 4/2005 | Yang et al. | ...................... | 16/337 |
| 7,155,781 B2 * | 1/2007 | Yamada et al. | ................. | 16/367 |
| 7,380,313 B2 * | 6/2008 | Akiyama et al. | ................ | 16/367 |
| 7,478,458 B2 * | 1/2009 | Tajima | ............................ | 16/367 |
| 7,533,450 B2 * | 5/2009 | Chien | ............................. | 16/367 |
| 7,624,477 B2 * | 12/2009 | Chien et al. | ..................... | 16/286 |
| 7,735,197 B2 * | 6/2010 | Chien | ............................. | 16/337 |
| 7,779,511 B2 * | 8/2010 | Hung | .............................. | 16/367 |
| 2008/0000050 A1 * | 1/2008 | Hsu | ................................. | 16/367 |
| 2008/0047105 A1 * | 2/2008 | Chang et al. | .................... | 16/374 |

* cited by examiner

*Primary Examiner* — Victor Batson
*Assistant Examiner* — Matthew Sullivan
(74) *Attorney, Agent, or Firm* — Steven M. Reiss

(57) ABSTRACT

A dual-axis hinge mechanism includes a rotatable bracket, a first rotatable assembly rotatably assembled on the rotatable bracket, and a second rotatable assembly pivotally assembled to the rotatable bracket. The second rotatable assembly includes a fixed bracket, a pivot shaft rotatably extended through the fixed bracket, a first limiting member rotatably sleeved on the pivot shaft, and a second limiting member non-rotatably sleeved on the pivot shaft. The second limiting member is rotated a certain angle follow the pivot shaft in a clockwise or counterclockwise direction, and then drives the first limiting member to rotate with the second limiting member. The total of the rotatable angle of the second limiting member relative to the first limiting member and the rotatable angle of the first limiting member relative to the fixed bracket is about 360 degrees.

16 Claims, 17 Drawing Sheets

DUAL-AXIS HINGE MECHANISM

BACKGROUND

1. Technical Field

The present disclosure generally relates to hinge mechanisms, particularly, to a dual-axis hinge mechanism typically used for an electronic device.

2. Description of Related Art

An electronic device such as a mobile phone, a notebook computer, or a personal digital assistant (PDA), generally has a main body and a display cover. In general, the display cover is connected to the main body via a dual-axis hinge mechanism to realize rotating or folding-over functions, so as to facilitate adjustment of the position of the display cover relative to the user.

A typical dual-axis hinge mechanism includes a rotatable bracket, a first rotatable assembly rotatably assembled on the rotatable bracket, and a second rotatable assembly pivotally assembled on the rotatable bracket. The display cover is rotatably connected to the main body via the first rotatable assembly to realize folding-over function, and the display cover is pivotally connected to the main body via the second rotatable assembly to realize rotating function. Generally, the second rotatable assembly includes a limiting member to restrict a rotation range of the display cover, thus preventing electric wires of the electronic device from damaging during the rotation process. However, a viewing angle of the display cover often need to be adjusted by moving the display cover together with the main body, due to the limited rotation range of the display cover, and thus causing an inconvenience to a user.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

The present dual-axis hinge mechanism may be used in electronic devices such as notebook computers, PDAs, or mobile phones. Hereinafter, for the purposes of conveniently describing the dual-axis hinge mechanism of the present disclosure, an embodiment of the dual-axis hinge mechanism as used in a notebook computer is described and illustrated.

Figure 1:
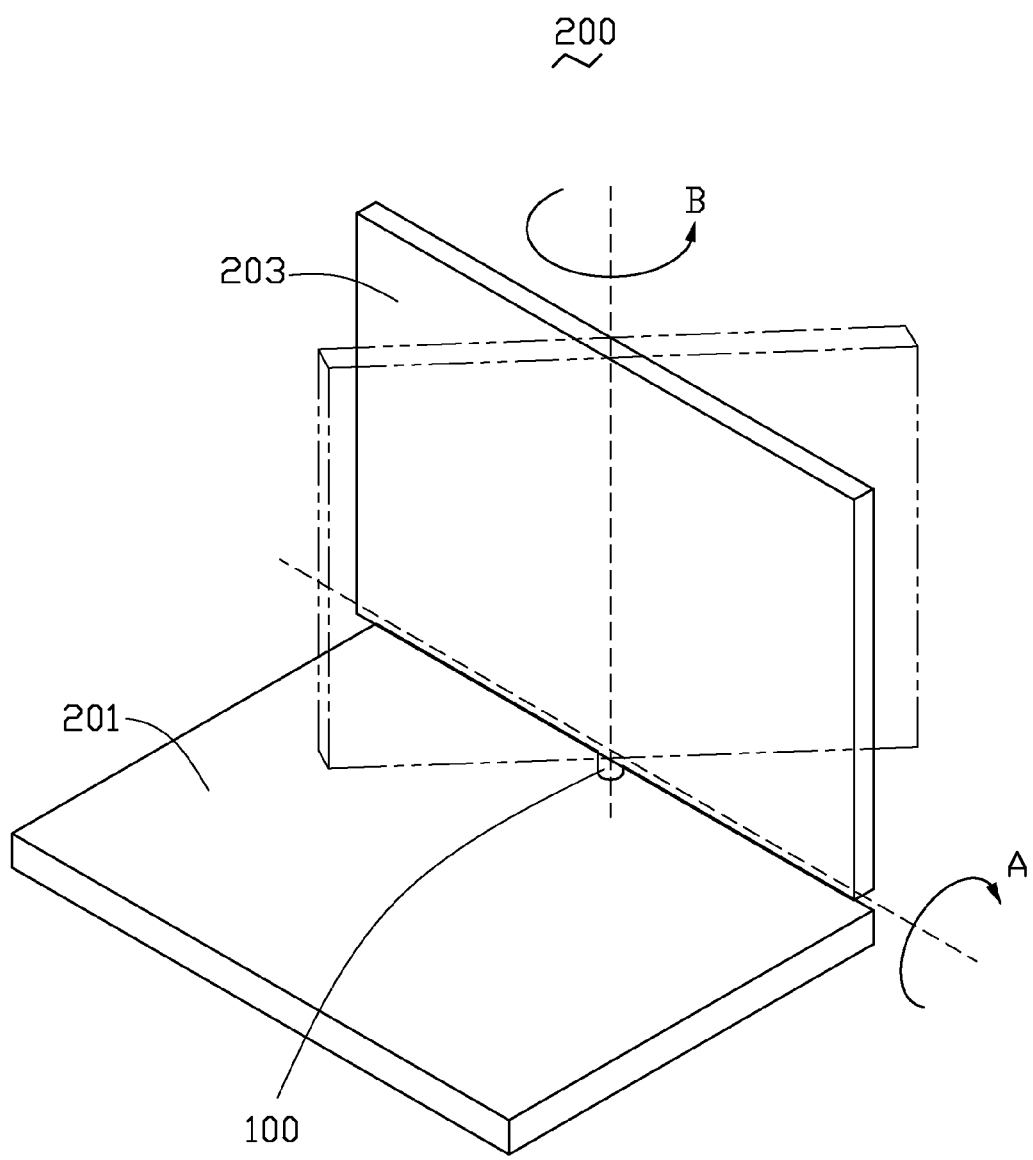
FIG. 1 is a schematic view of a notebook computer with a dual-axis hinge mechanism of one embodiment of the present disclosure.

Referring to FIG. 1, a notebook computer 200 with a dual-axis hinge mechanism 100 is shown. The notebook computer 200 includes a main body 201 and a display cover 203 pivotally connected to the main body 201 via the dual-axis hinge mechanism 100.

Figure 2:
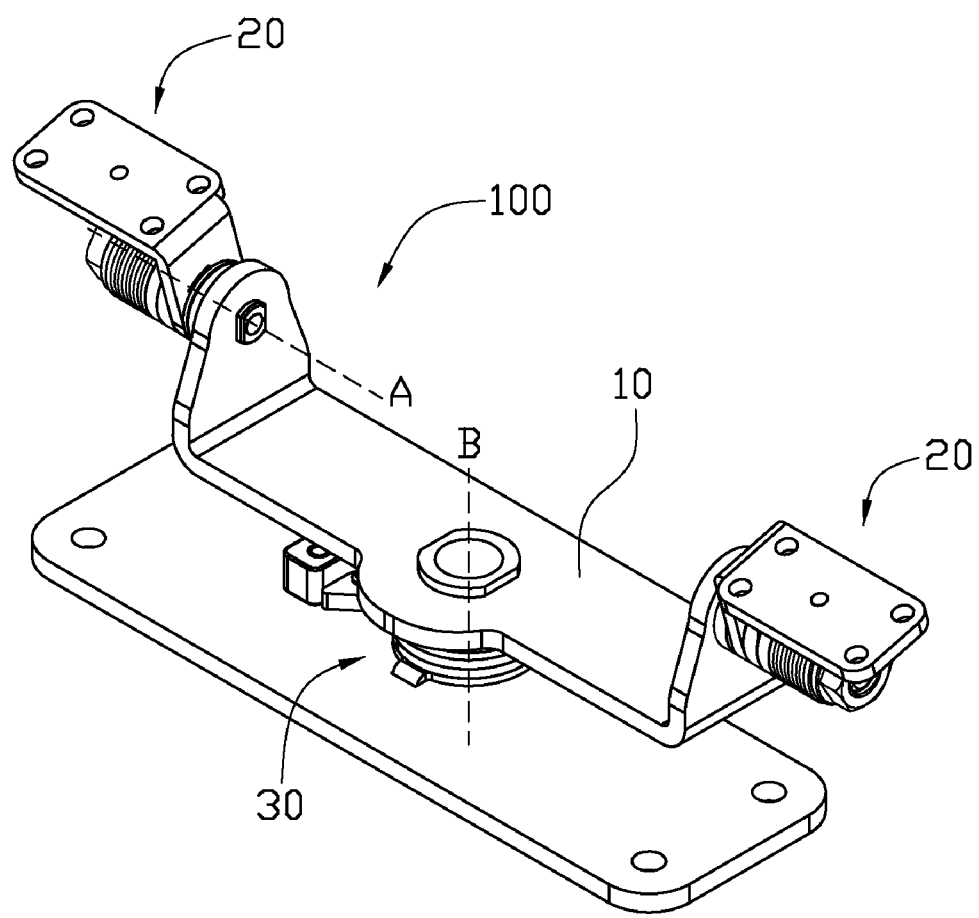
FIG. 2 is an assembled view of the dual-axis hinge mechanism in FIG. 1, the dual-axis hinge mechanism including a first rotatable assembly and a second rotatable assembly.

Referring also to FIG. 2, the dual-axis hinge mechanism 100 includes a rotatable bracket 10, two first rotatable assemblies 20 rotatably assembled on opposite ends of the rotatable bracket 10, and a second rotatable assembly 30 pivotally assembled to a middle portion of the rotatable bracket 10. An axis A of each first rotatable assembly 20 perpendicularly intersects with an axis B of the second rotatable assembly 20. The first rotatable assemblies 20 may be fixed to the display cover 203, and the second rotatable assembly 30 may be fixed to the main body 201. Thus, the display cover 203 can be rotated around the axis A relative to the main body 201 via the first rotatable assemblies 20, and can also be rotated around the axis B relative to the main body 201 via the second rotatable assembly 30.

Figure 3:
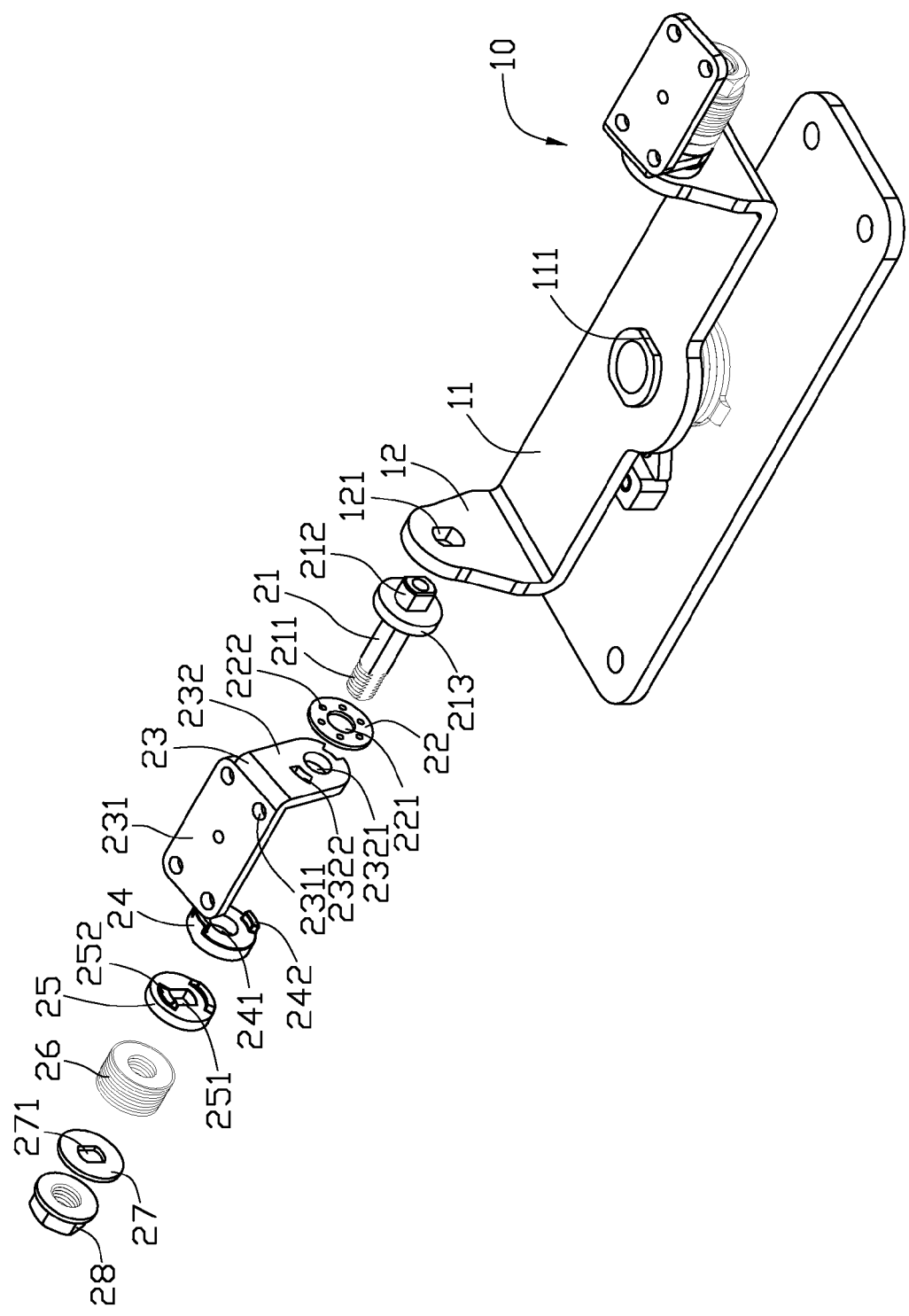
FIG. 3 is a partial, exploded, isometric view of the dual-axis hinge mechanism in FIG. 2, showing the first rotatable assembly is exploded.

Referring to FIG. 3, the rotatable bracket 10 may be substantially U-shaped, and includes a flat sheet 11, and two side sheets 12 extending substantially perpendicularly from opposite ends of the flat sheet 11. The flat sheet 11 defines a mounting hole 111 in the middle portion. Each side sheet 12 defines an assembling hole 121 in an end portion. The mounting hole 111 and assembling holes 121 are non-circular holes.

Each first rotatable assembly 20 includes a rotating shaft 21, a frictional piece 22, a connecting member 23, a rotating member 24, a stationary member 25, an elastic member 26, a flat washer 27, and a fastening member 28 sleeved on the rotating shaft 21.

A cross-section of the rotating shaft 21 may be non-circular. The rotating shaft 21 includes a threaded portion 211 formed on a first end, a shaft head 212 formed on a second end, and a flange 213 formed around the rotating shaft 21 adjacent to the shaft head 212.

The frictional piece 22 defines a substantially circular through hole 221 in a middle portion so that the frictional piece 22 is rotatably sleeved on the rotating shaft 21. The frictional piece 22 defines a plurality of lubricating oil grooves 222 in a side surface.

The connecting member 23 may be substantially L-shaped, and includes a fixed plate 231, and a connecting plate 232 extending substantially perpendicularly from an end of the fixed plate 231. The fixed plated 231 defines a plurality of fixing holes 2311 used to fix the connecting member 23 on the display cover 203. The connecting plate 232 defines a substantially circular shaft hole 2321 in an end portion, and two engaging grooves 2322 in the end portion adjacent to the circular shaft hole 2321.

The rotating member 24 defines a substantially circular through hole 241 in a middle portion so that the rotating member 24 is rotatably sleeved on the rotating shaft 21. The rotating member 24 forms two engaging protrusions 242 in a first side surface to be engaged in the engaging grooves 2322 of the connecting member 23. The rotating member 24 defines two positioning grooves (not shown) in a second side surface opposite to the first side surface.

The stationary member 25 defines a deformed through hole 251 in a middle portion so that the stationary member 25 is non-rotatably sleeved on the rotating shaft 21. The stationary member 25 forms two positioning protrusions 252 in a side surface to be engaged in the positioning grooves of the rotating member 24.

The elastic member 26 may be a plurality of spring washers contacting each other, and rotatably sleeved on the rotating shaft 21.

The flat washer 27 defines a deformed through hole 271 in a middle portion so that the flat washer 27 is non-rotatably sleeved on the rotating shaft 21.

The fastening member 28 may be a nut engaging with the threaded portion 211 of the rotating shaft 21 to keep the components between the flange 213 and the fastening member 28 together.

In assembly of the first rotatable assembly 20, the rotating shaft 21 is inserted through the frictional piece 22, the connecting member 23, the rotating member 24, the stationary member 25, the elastic member 26, and the flat washer 27 in that order. The fastening member 28 is engaged with the threaded portion 211 of the rotating shaft 21. The engaging protrusions 242 of the rotating member 24 are engaged in the engaging grooves 2322 of the connecting member 23. The positioning protrusions 252 of the stationary member 25 are engaged in the positioning grooves of the rotating member 24. The shaft head 212 of the rotating shaft 21 is engaged in the assembling hole 121 of the rotatable bracket 10. Such that, one first rotatable assembly 20 is assembled on one side sheet 12 of the rotatable bracket 10. Similarly, the other first rotatable assembly 20 is assembled on the other side sheet 12 of the rotatable bracket 10.

Figure 4:
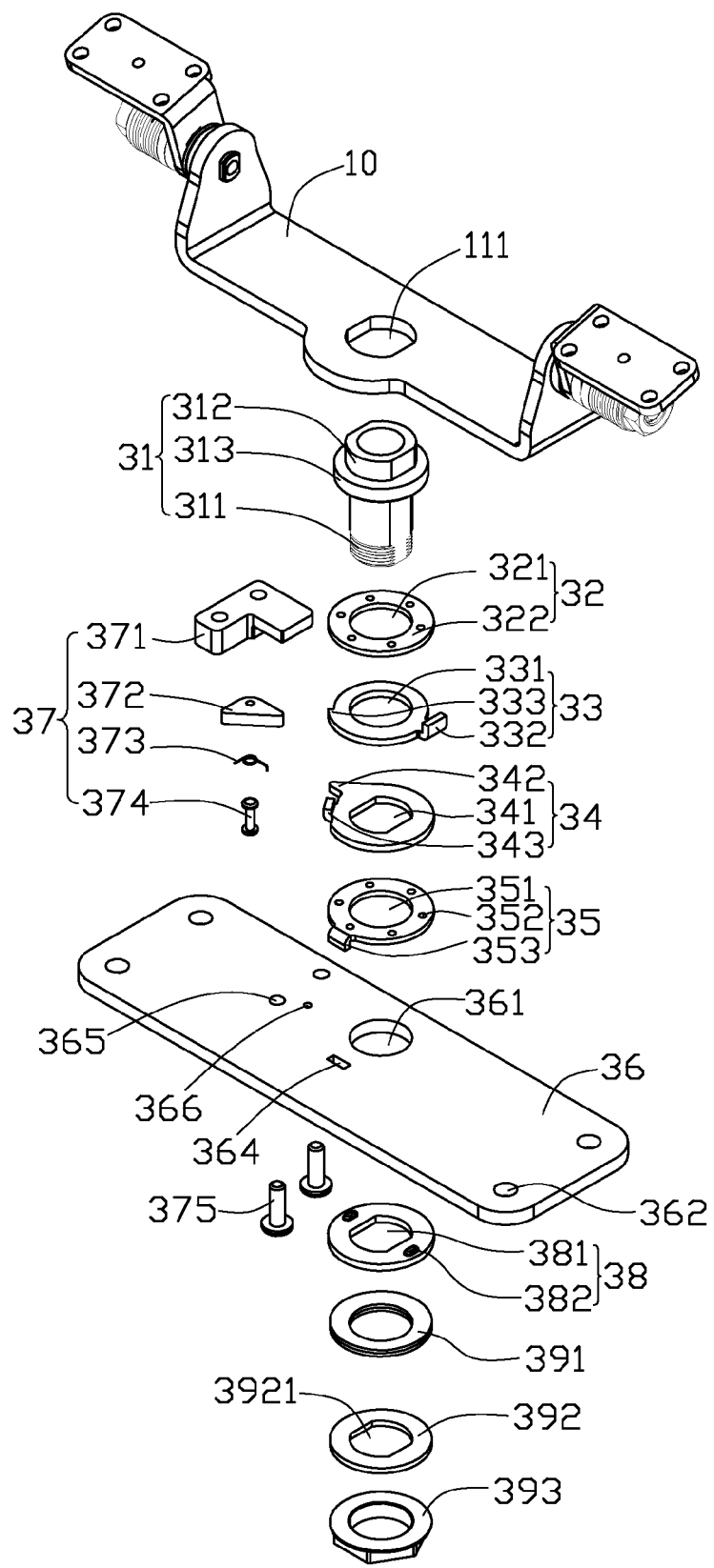
FIG. 4 is a partial, exploded, isometric view of the dual-axis hinge mechanism in FIG. 2, showing the second rotatable assembly is exploded.
Figure 5:
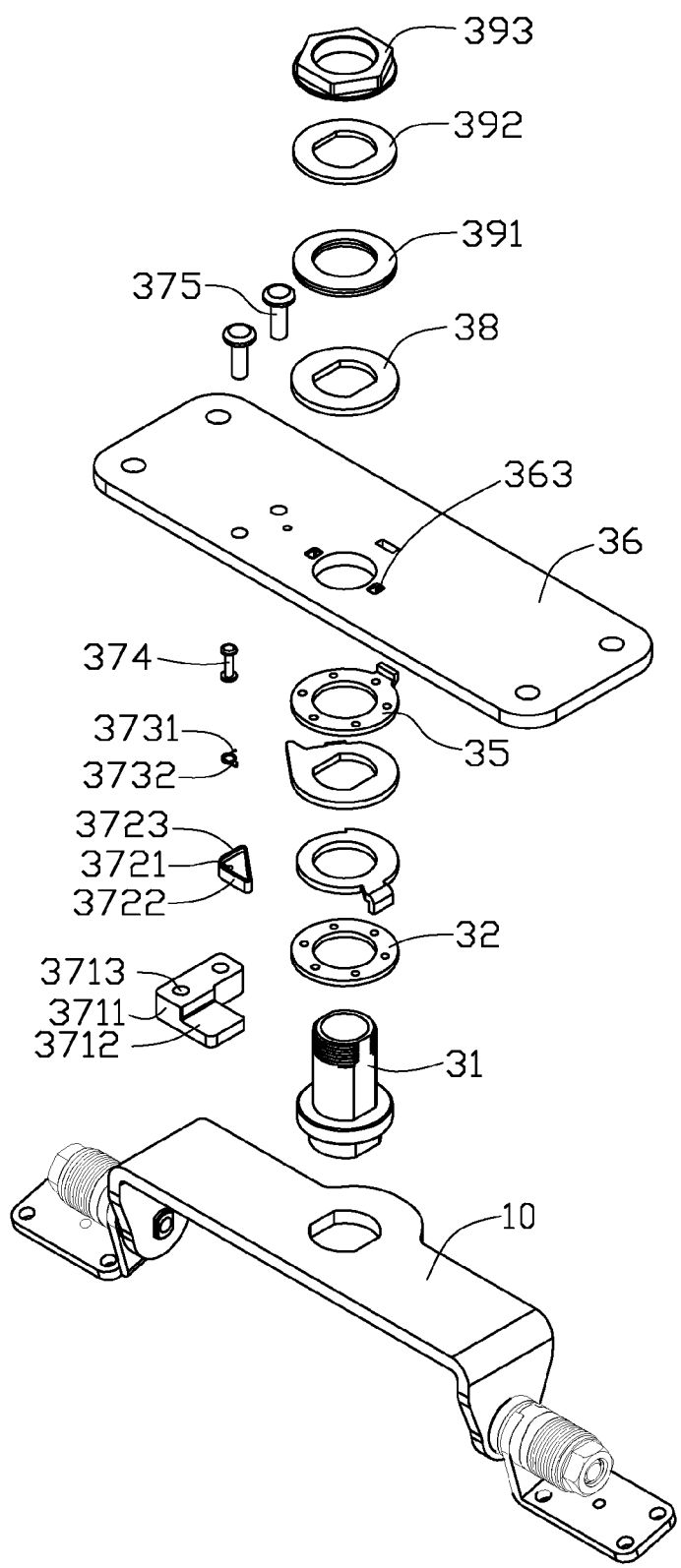
FIG. 5 is similar to FIG. 4, but viewed from another direction.

Referring to FIGS. 4 and 5, the second rotatable assembly 30 includes a pivot shaft 31, a frictional piece 32, a first limiting member 33, a second limiting member 34, a protecting member 35, a fixed bracket 36, a restricting module 37 assembled on the fixed bracket 36, a positioning member 38, a resilient member 391, a flat washer 392, and a fastening member 393 sleeved on the pivot shaft 31.

A cross-section of the pivot shaft 31 may be non-circular. The pivot shaft 31 includes a threaded portion 311 formed on a first end, a shaft head 312 formed on a second end opposite to the first end, and a flange 313 formed around the pivot shaft 31 adjacent to the shaft head 312.

The frictional piece 32 defines a substantially circular through hole 321 in a middle portion so that the frictional piece 32 is rotatably sleeved on the pivot shaft 31. The frictional piece 32 defines a plurality of lubricating oil grooves 322 in a side surface.

The first limiting member 33 defines a substantially circular through hole 331 in a middle portion so that the first limiting member 33 is rotatably sleeved on the pivot shaft 31. The first limiting member 33 forms a limiting tab 332 on an edge portion, and a latching protrusion 333 on an edge portion opposite to the limiting tab 332.

The second limiting member 34 defines a deformed through hole 341 in a middle portion so that the second limiting member 34 is non-rotatably sleeved on the pivot shaft 31. The second limiting member 34 forms a limiting protrusion 342 on an edge portion, and a latching tab 343 on an edge portion adjacent to the limiting protrusion 342.

The protecting member 35 defines a substantially circular through hole 351 in a middle portion so that the protecting member 35 is rotatably sleeved on the pivot shaft 31. The protecting member 35 defines a plurality of lubricating oil grooves 352 in a side surface, and forms a fixing tab 353 on an edge portion.

The fixed bracket 36 is a substantially rectangular plate, and defines a substantially circular shaft hole 361 in a middle portion, and a plurality of fixing holes 362 in two end portions used to fix the fixed bracket 36 on the main body 201. The fixed bracket 36 also defines two positioning grooves 363 and a retaining hole 364 adjacent to the circular shaft hole 361. The fixed bracket 36 further defines two mounting holes 365 and a pin hole 366 between the circular shaft hole 361 and the fixing holes 362.

The positioning member 38 defines a deformed through hole 381 in a middle portion so that the positioning member 38 is non-rotatably sleeved on the pivot shaft 31. The positioning member 38 forms two positioning protrusions 382 in a side surface to be engaged in the positioning grooves 363 of the fixed bracket 36 correspondingly.

The resilient member 391 may be a plurality of spring washers contacting each other, and rotatably sleeved on the pivot shaft 31.

The flat washer 392 defines a deformed through hole 3921 in a middle portion so that the flat washer 392 is non-rotatably sleeved on the pivot shaft 31.

The fastening member 393 may be a nut engaging with the threaded portion 311 of the pivot shaft 31 to keep the components between the flange 313 and the fastening member 393 together.

The restricting module 37 includes a first restricting member 371, a second restricting member 372, a torsion spring 373, a pin 374, and two screws 375.

The first restricting member 371 may be substantially L-shaped, and includes a main body 3711, and a restricting portion 3712 extending substantially perpendicularly from an end of the main body 3711. The main body 3711 defines two threaded holes 3713. The restricting portion 3712 is thinner than the main body 3711.

The second restricting member 372 may be substantially triangular. In the illustrated embodiment, the second restricting member 372 includes two side walls 3722, 3723 cooperatively define a right-angle. The second restricting member 372 defines a pin hole 3721 adjacent to the right-angled portion.

The torsion spring 373 includes a first latching portion 3731 and a second latching portion 3732 extending from opposite ends of the torsion spring 373.

In assembly of the second rotatable assembly 30, the pivot shaft 31 is inserted through the frictional piece 32, the first limiting member 33, the second limiting member 34, the protecting member 35, the shaft hole 361 of the fixed bracket 36, the positioning member 38, the resilient member 391, and the flat washer 392 in that order. The fastening member 393 is engaged with the threaded portion 311 of the pivot shaft 31. The fixing tab 353 of the protecting member 35 is engaged in the retaining hole 364 of the fixed bracket 36. The positioning protrusions 382 of the positioning member 38 are engaged in the positioning grooves 363 of the fixed bracket 36.

The restricting module 37 may be assembled as follows. The screws 375 are inserted through the mounting holes 365 of the fixed bracket 36, and engaged with the threaded holes 3713 of the first restricting member 371, thus fixing the first restricting member 371 on the fixed bracket 36. The pin 374 is inserted through the pin hole 366 of the fixed bracket 36, the torsion spring 373, and the pin hole 3721 of the second restricting member 372. The second restricting member 372 is rotatable around the pin 374 relative to the fixed bracket 36. Since the thickness difference between the main body 3711 and the restricting portion 3712 of the first restricting member 371 is larger than the thickness of the second restricting member 372, the second restricting member 372 can be rotated into a gap 370 (shown in FIG. 9) defined between the restricting portion 3712 and the fixed bracket 36. The torsion spring 373 is tightly sleeved on the pin 374, and is nonrotatable relative to the fixed bracket 36. The first and second latching portions 3731, 3732 of the torsion spring 373 respectively abut on inner surfaces of the side walls 3722, 3723 of the second restricting member 372.

Finally, the shaft head 312 of the pivot shaft 31 is engaged in the mounting hole 111 of the rotatable bracket 10. Thus, the second rotatable assembly 30 is pivotally assembled to the rotatable bracket 10.

Referring also to FIGS. 1 to 3, when the dual-axis hinge mechanism 100 is used in the notebook computer 200, the connecting members 23 of the first rotatable assemblies 20 are mounted on the display cover 203, the fixed bracket 36 of the second rotatable assembly 30 is mounted on the main body 201. The display cover 203 is rotated together with the connecting members 23 around an axis of the rotating shafts 21, thus realizing a folding-over function. The elastic member 26 provides an axial force to push the components of the first rotatable assembly 20 to contact each other tightly. Thus, the display cover 203 may be maintained at a desired angle due to the frictional forces generated between the components of the first rotatable assembly 20. The positioning protrusions 252 of the stationary member 25 are engaged in the positioning grooves of the rotating member 24, thereby stably retaining the display cover 203 at predetermined angles. In the illustrated embodiment, the display cover 203 may be stably retained at 0 degree or 180 degrees relative to the main body 201.

When a viewing angle of the display cover 203 need to be adjusted, the display cover 203 is rotated together with the rotatable bracket 10 around an axis of the pivot shaft 31. The resilient member 391 provides an axial force to push the components of the second rotatable assembly 30 to contact each other tightly. Thus, the display cover 203 may be maintained at a desired viewing angle due to the frictional forces generated between the components of the second rotatable assembly 30. The positioning protrusions 382 of the positioning member 38 are engaged in the positioning grooves 363 of the fixed bracket 36, thereby stably retaining the display cover 203 at predetermined viewing angles. In the illustrated embodiment, the display cover 203 may be stably retained at about 0 degree, 180 degrees, or 360 degrees relative to the main body 201.

In the rotation process, the display cover 203 may be rotated from about 0 degree to 360 degrees to facilitate the adjustment of the viewing angle of the display cover 203. The restricting module 37 may be used to restrict the display cover 203 to be rotated about 360 degrees, respectively in a clockwise direction or a counterclockwise direction, and cannot be further rotated beyond 360 degrees, thus preventing electric wires of the notebook computer 200 from damages when rotating. The different working states of the second rotatable assembly 30 will be described in detail.

Figure 6:
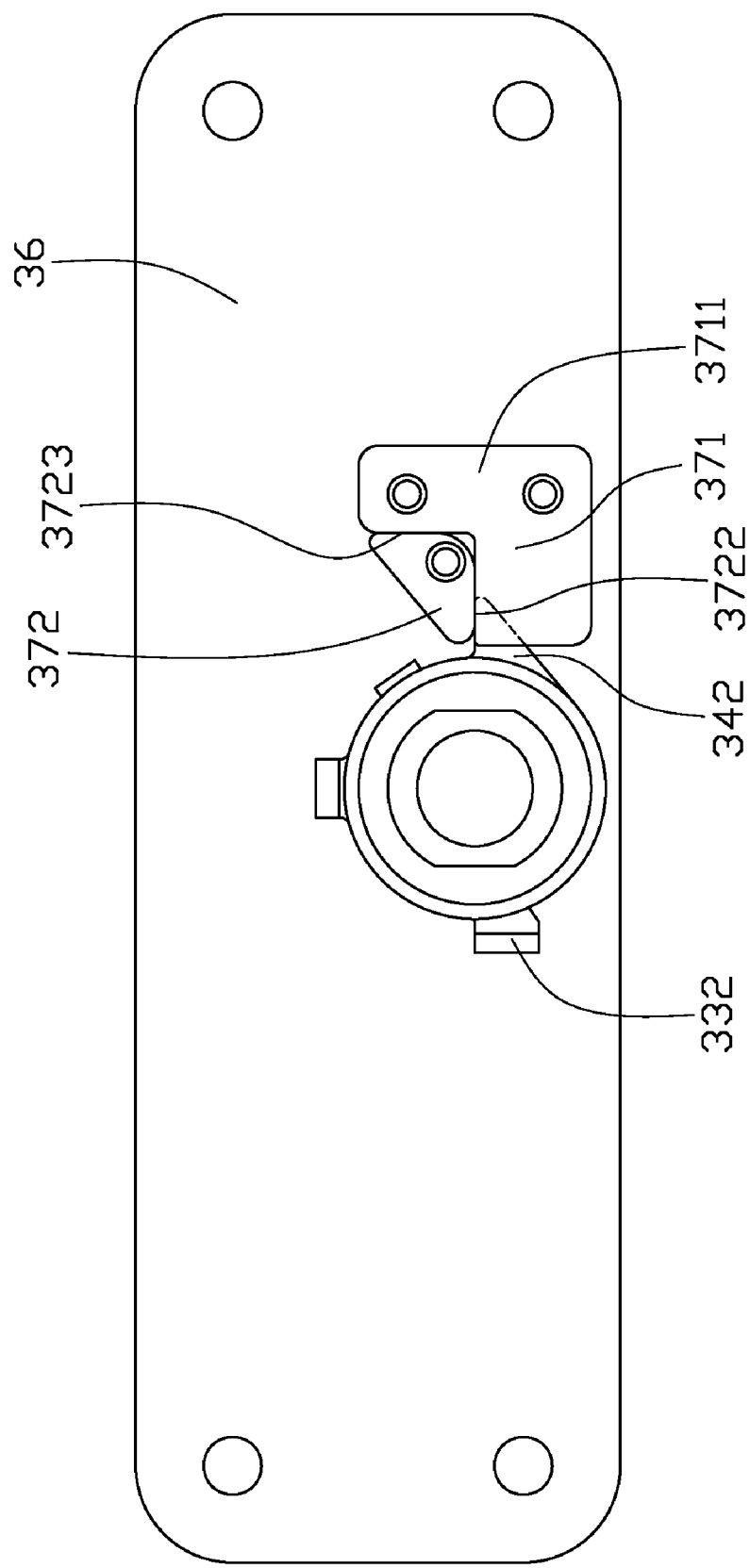
FIGS. 6, 8, 10, 12, 14, 16 are assembled, plan views of the second rotatable assembly in FIG. 2, respectively showing the second rotatable assembly in different working states.
Figure 7:
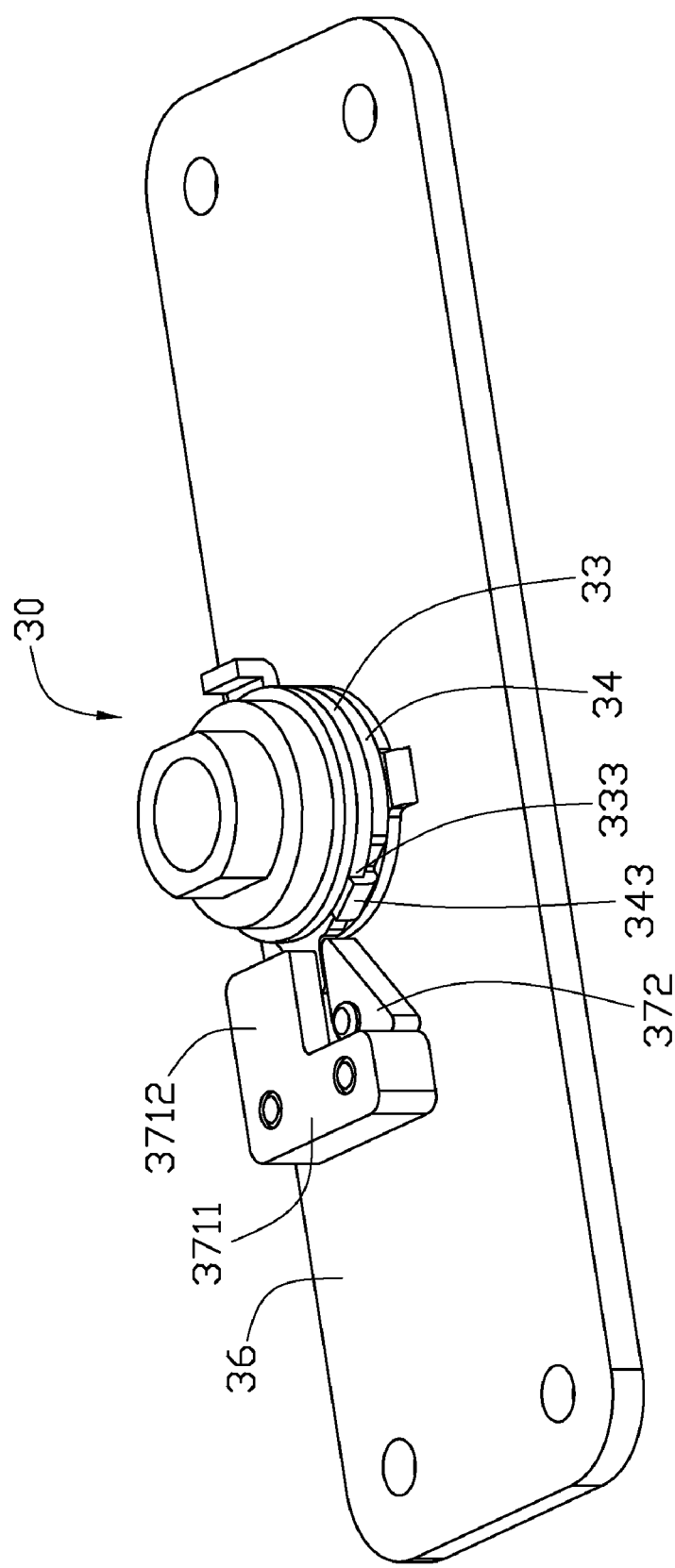
FIGS. 7, 9, 11, 13, 15, 17 are assembled, isometric views of the second rotatable assembly respectively corresponding to the FIGS. 6, 8, 10, 12, 14, 16.

Referring also to FIGS. 6 and 7, in an initial state, the side wall 3723 of the second restricting member 372 abuts the main body 3711 of the first restricting member 371, thus the second restricting member 372 is stationary relative to the fixed bracket 36. The limiting protrusion 342 of the second limiting member 34 abuts the side wall 3722 of the second restricting member 372, thus the display cover 203 can not be rotated in the counterclockwise direction.

Figure 8:
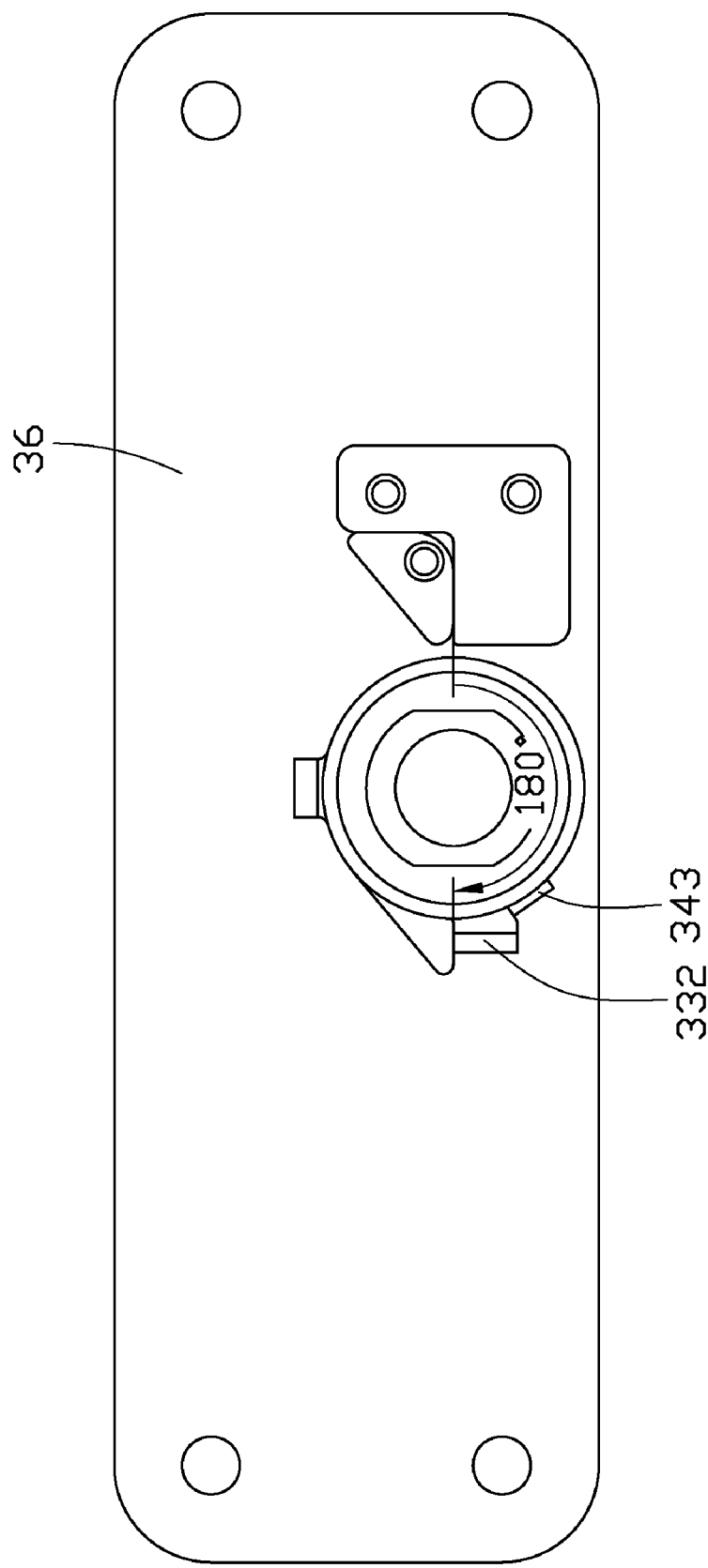
Figure 9:
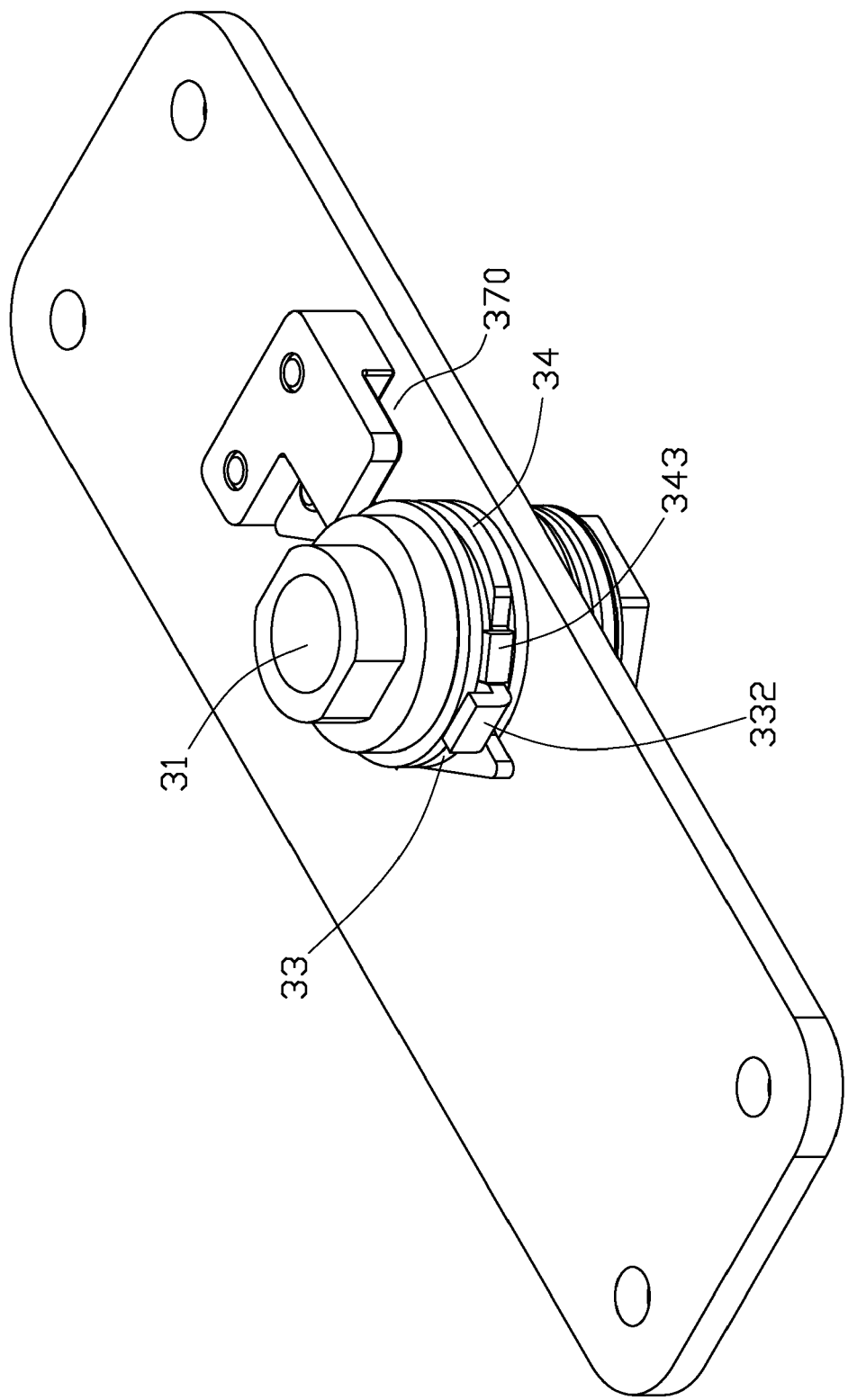

Referring also to FIGS. 8 and 9, when the display cover 203 is rotated relative to the main body 201 in the clockwise direction, the pivot shaft 31 is rotated together with the second limiting member 34. When the display cover 203 is rotated 180 degrees, the latching tab 343 of the second limiting member 34 abuts the limiting tab 332 of the first limiting member 33, thus driving the first limiting member 33 to rotate together with the second limiting member 34 in subsequent rotation process.

Figure 10:
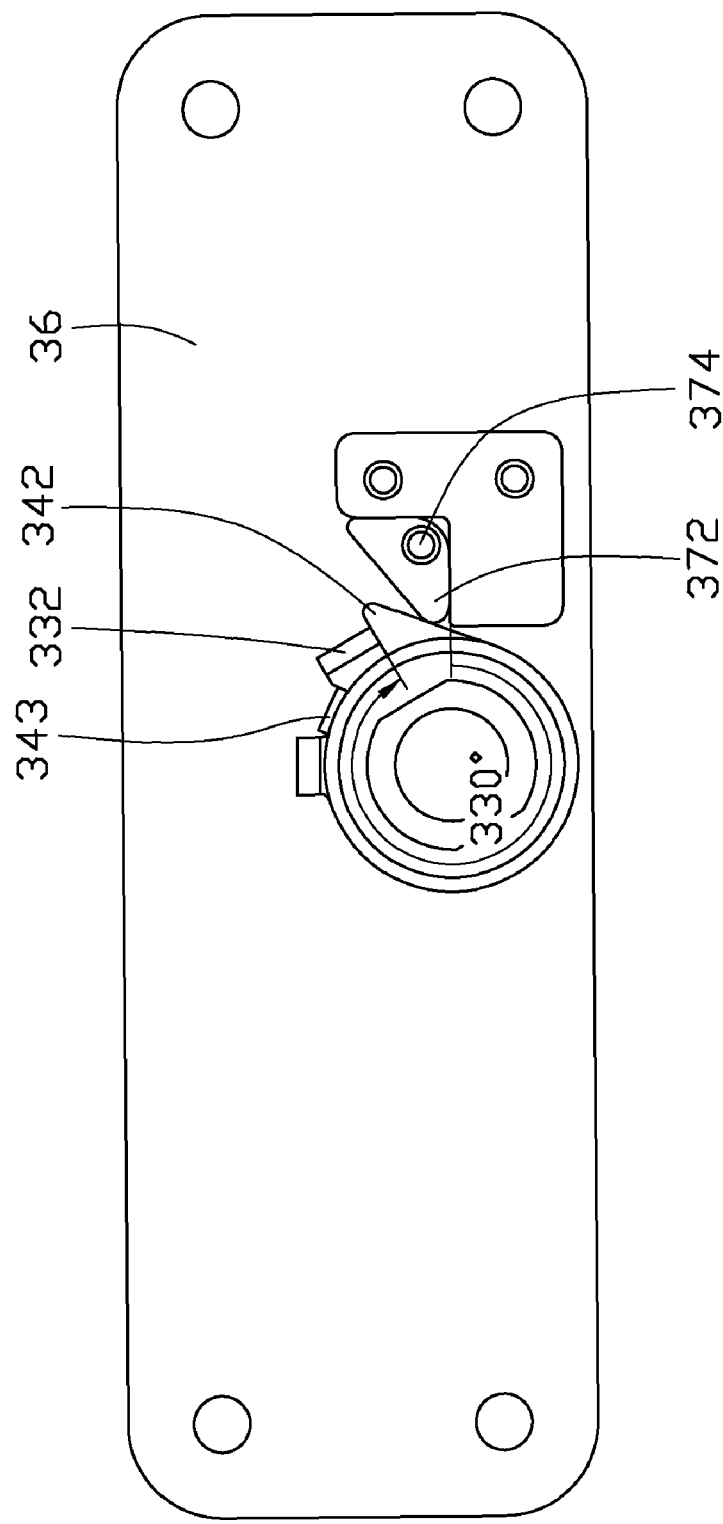
Figure 11:
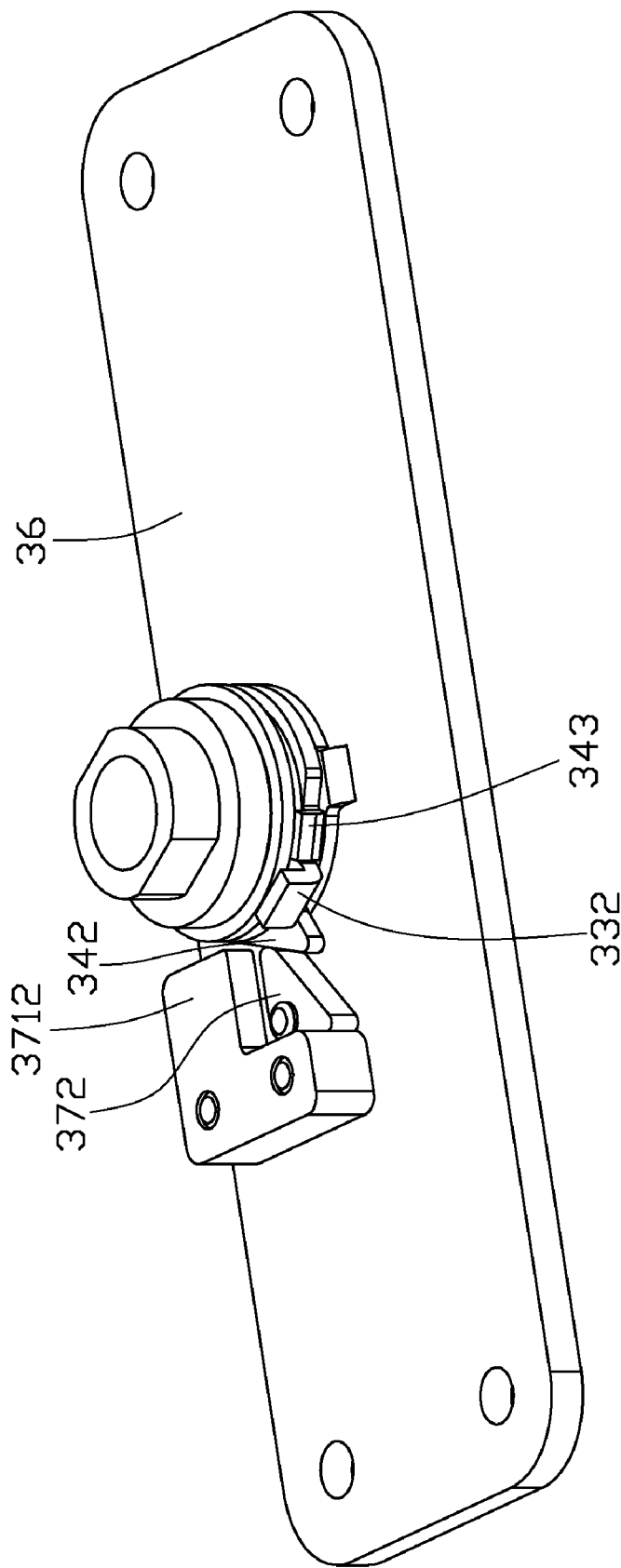

Referring also to FIGS. 10 and 11, when the display cover 203 is rotated 330 degrees, the limiting protrusion 342 of the second limiting member 34 abuts the second restricting member 372. The second restricting member 372 will be rotated around the pin 374, and a portion of the second restricting member 372 will be inserted into the gap 370. Thus, the display cover 203 will be rotated further.

Figure 12:
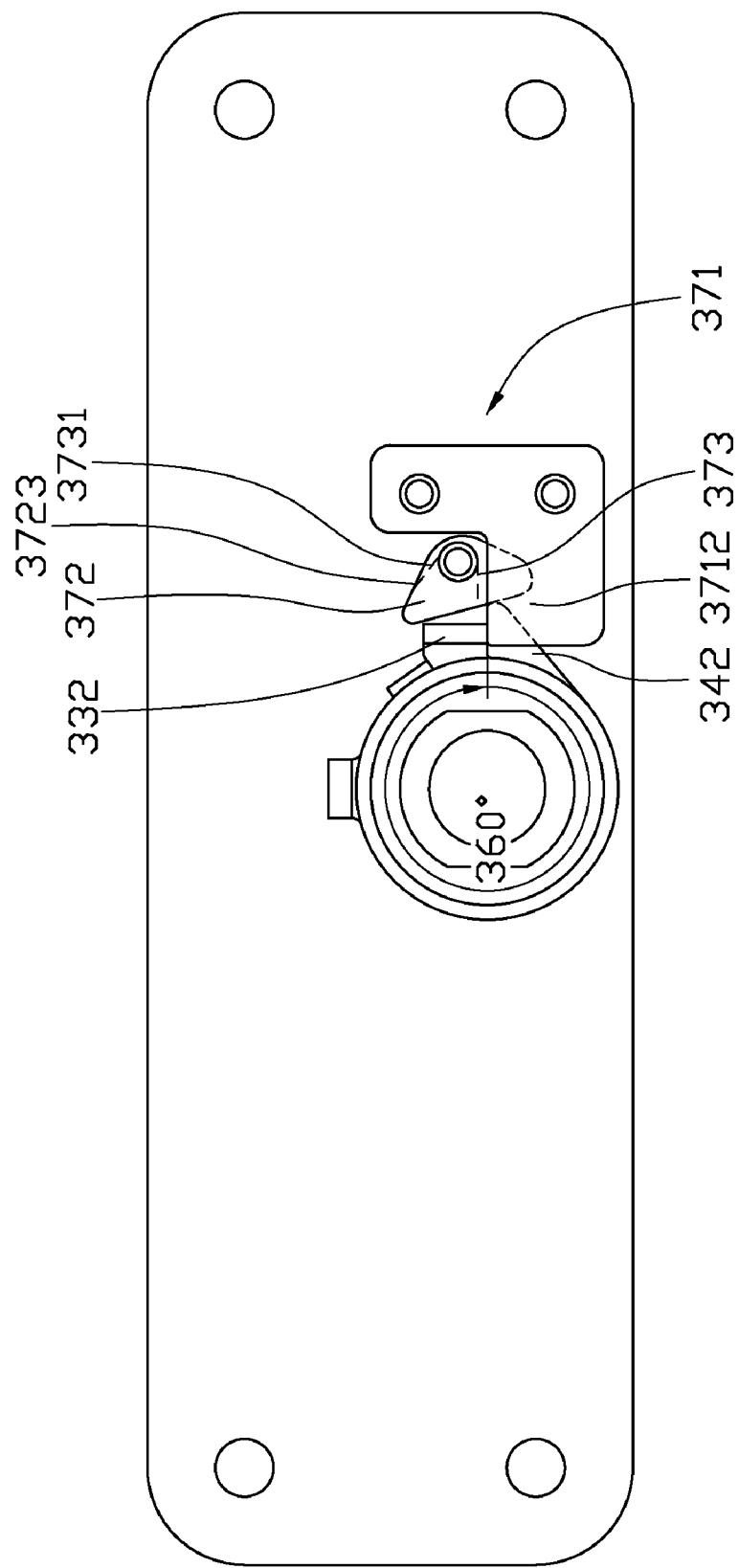
Figure 13:
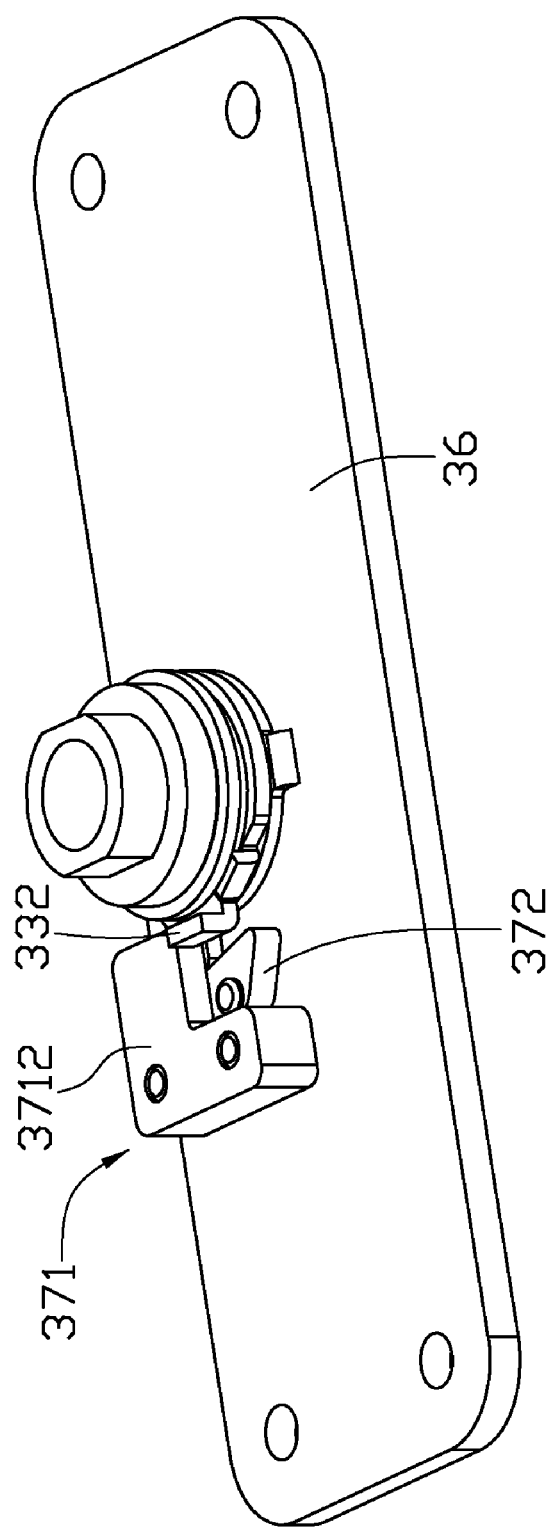

Referring also to FIGS. 12 and 13, when the display cover 203 is rotated about 360 degrees, the limiting protrusion 342 of the second limiting member 34 is rotated to the initial position. The limiting tab 332 of the first limiting member 33 abuts the restricting portion 3712 of the first restricting member 371, thus the display cover 203 can not be rotated further in the clockwise direction. In such time, the first latching portion 3731 of the torsion spring 373 is pushed by the side wall 3723 of the second restricting member 372, thus retaining the torsion spring 373 in a torsion state.

Figure 14:
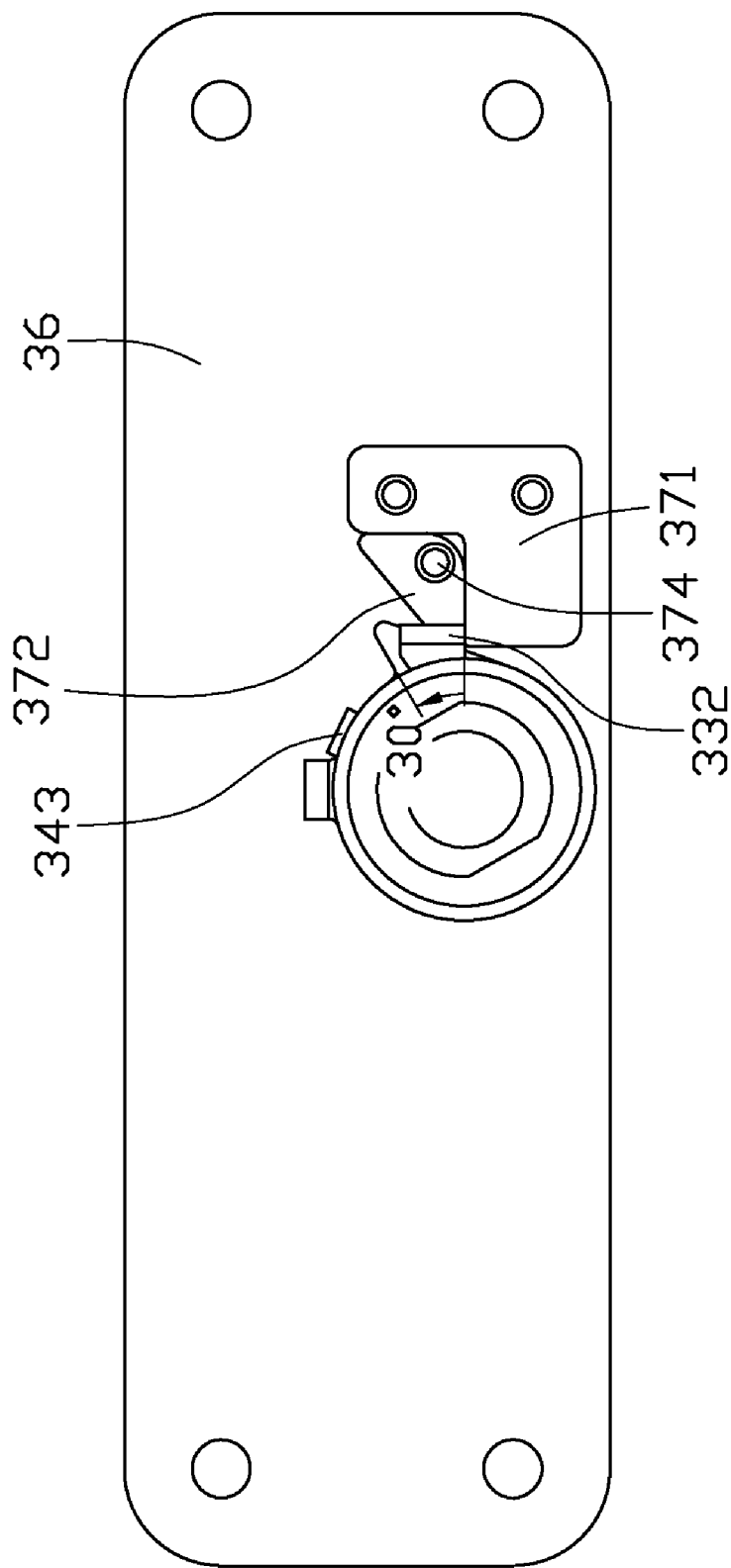
Figure 15:
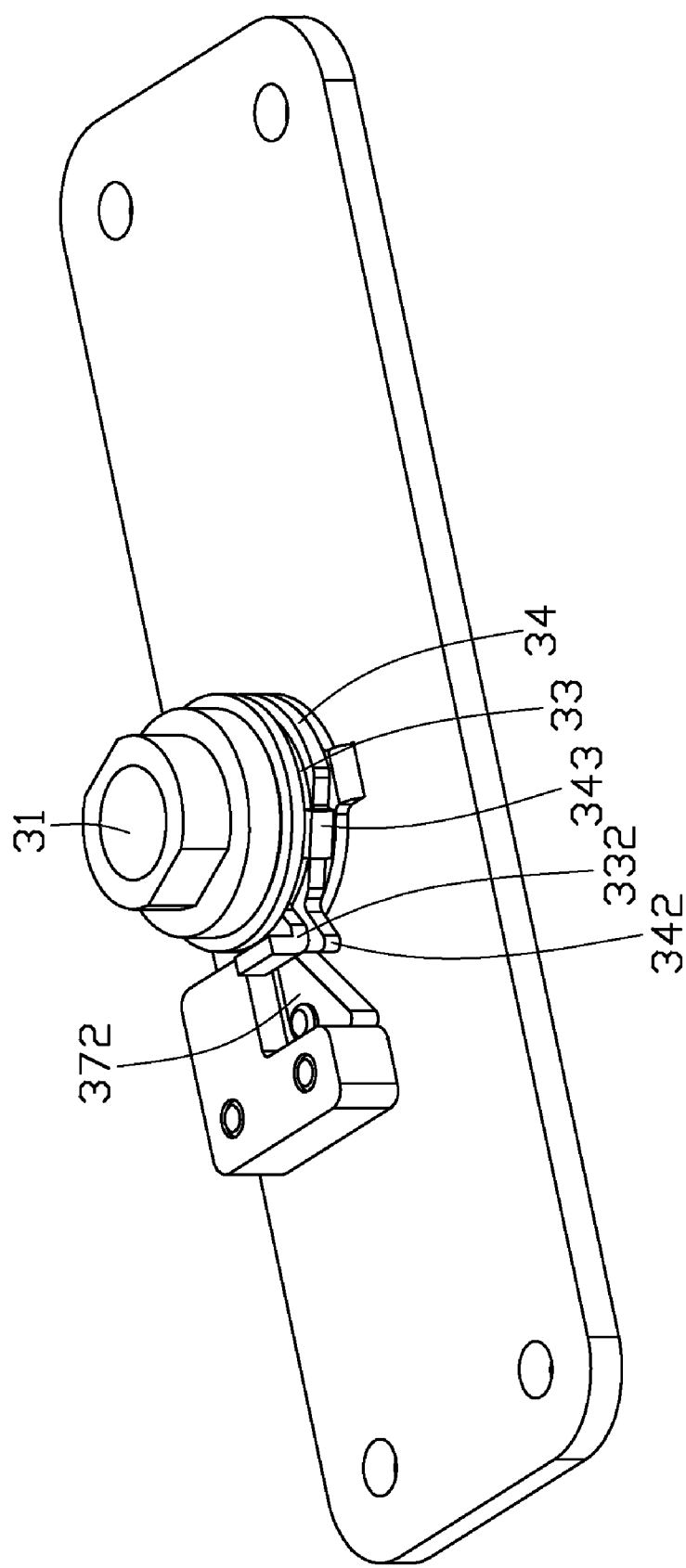

Referring also to FIGS. 14 and 15, when the display cover 203 is rotated relative to the main body 201 in the counterclockwise direction, the pivot shaft 31 is rotated together with the second limiting member 34. The latching tab 343 of the second limiting member 34 is separated from the limiting tab 332 of the first limiting member 33, so that the first limiting member 33 is stationary relative to the fixed bracket 36. When the display cover 203 is rotated 30 degrees, the limiting protrusion 342 of the second limiting member 34 is separated from the second restricting member 372. Thus, the second restricting member 372 is rotated to the initial portion due to the elastic force generated by the torsion spring 373.

Figure 16:
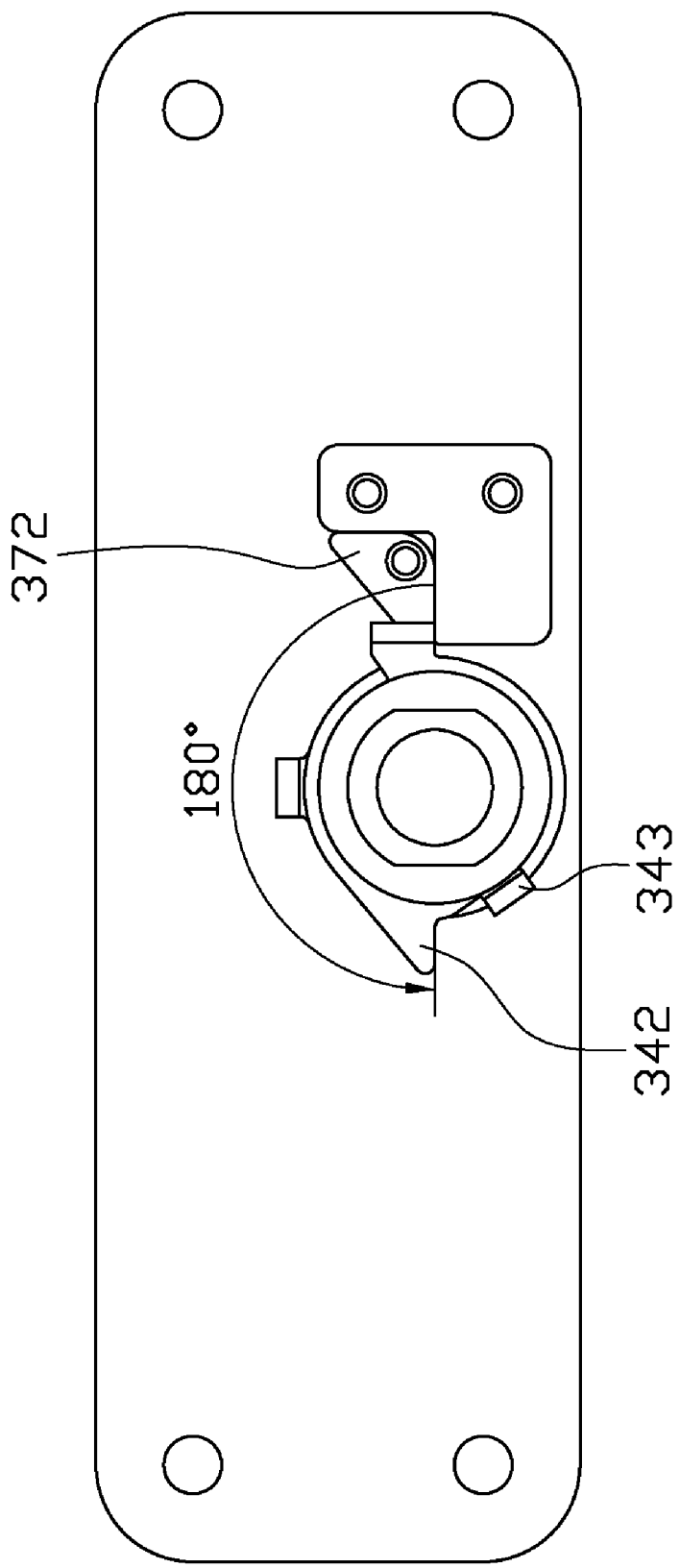
Figure 17:
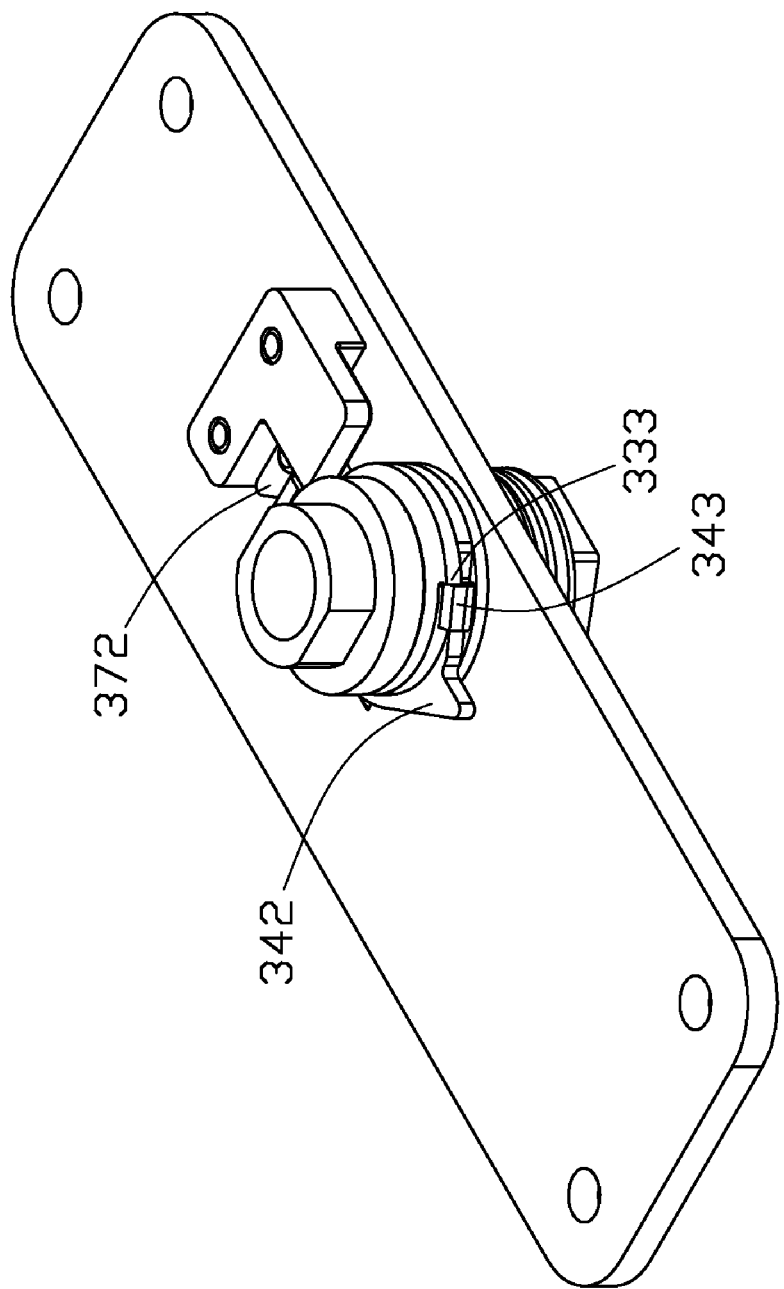

Referring also to FIGS. 16 and 17, when the display cover 203 is rotated 180 degrees, the latching tab 343 of the second limiting member 34 abuts the latching protrusion 333 of the first limiting member 33, thus driving the first limiting member 33 to rotate together with the second limiting member 34 in subsequent rotation process, until the limiting protrusion 342 of the second limiting member 34 abuts the second restricting member 372. In such time, the display cover 203 cannot be rotated further in the counterclockwise direction, and all components of the second rotatable assembly 30 are reverted to the initial state (shown in FIGS. 6 and 7).

In the clockwise or the counterclockwise rotation process, the second limiting member 34 is rotated 180 degrees relative to the first limiting member 33, the first limiting member 33 is rotated 180 degrees relative to the fixed bracket 36. It should be understood that, the positions of the latching protrusion 333 and the limiting tab 332 on the first limiting member 33 may be varied. The positions of the limiting protrusion 342 and the latching tab 343 on the second limiting member 34 may also be varied. Therefore, the second limiting member 34 may be rotated a desired angle, such as 90 degrees, 270 degrees, and then driving the first limiting member 33 to rotate together with the second limiting member 34 in subsequent rotation process. In other words, the total of the rotatable angle of the second limiting member 34 relative to the first limiting member 33 and the rotatable angle of the first limiting member 33 relative to the fixed bracket 36 is about 360 degrees.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A dual-axis hinge mechanism, comprising:
   a fixed bracket;
   a pivot shaft rotatably extended through the fixed bracket;
   a first limiting member rotatably sleeved on the pivot shaft;
   a second limiting member non-rotatably sleeved on the pivot shaft, the second limiting member being rotated a rotatable angle following the pivot shaft, and then driving the first limiting member to rotate together with the second limiting member;
   wherein the total of the rotatable angle of the second limiting member relative to the first limiting member and the rotatable angle of the first limiting member relative to the fixed bracket is 360 degrees, the first limiting member forms a latching protrusion and a limiting tab; the second limiting member forms a latching tab; the dual-axis hinge mechanism further comprises a restricting module assembled on the fixed bracket, the restricting module comprises a first restricting member and a second restricting member; the second limiting member further forms a limiting protrusion; the limiting tab of the first limiting member abuts the first restricting member to prevent the pivot shaft from rotating further in a first direction; the limiting protrusion of the second limiting member abuts the second restricting member to prevent the pivot shaft from rotating further in a second direction.

2. The dual-axis hinge mechanism of claim 1, wherein the restricting module further comprises a pin; the first restricting member is fixed on the fixed bracket;
   the second restricting member is rotatably assembled on the fixed bracket by the pin; the first restricting member comprises a main body and a restricting portion thinner than the main body; the thickness difference between the main body and the restricting portion is larger than the thickness of the second restricting member, thus the second restricting member can be rotated into a gap defined between the restricting portion and the fixed bracket.

3. The dual-axis hinge mechanism of claim 2, wherein the restricting module further comprises a torsion spring non-rotatably sleeved on the pin; the second restricting member comprises two side walls; the torsion spring comprises a first latching portion and a second latching portion respectively abutting inner surfaces of the side walls of the second restricting member.

4. The dual-axis hinge mechanism of claim 1, further comprising a positioning member non-rotatably sleeved on the pivot shaft; the fixed bracket defines a positioning groove, the positioning member forms a positioning protrusion engaged in the positioning groove of the fixed bracket.

5. The dual-axis hinge mechanism of claim 1, further comprising a frictional piece, a protecting member, a resilient member, a flat washer sleeved on the pivot shaft, and a fastening member engaged on an end of the pivot shaft.

6. A dual-axis hinge mechanism, comprising:
   a rotatable bracket;
   a first rotatable assembly rotatably assembled on the rotatable bracket; and
   a second rotatable assembly pivotally assembled to the rotatable bracket, the second rotatable assembly comprising:
   a fixed bracket;
   a pivot shaft rotatably extended through the fixed bracket;
   a first limiting member rotatably sleeved on the pivot shaft;
   a second limiting member non-rotatably sleeved on the pivot shaft, the second limiting member being rotated a rotatable angle following the pivot shaft, and then driving the first limiting member to rotate together with the second limiting member;
   wherein the total of the rotatable angle of the second limiting member relative to the first limiting member and the rotatable angle of the first limiting member relative to the fixed bracket is 360 degrees; the first limiting member forms a latching protrusion and a limiting tab; the second limiting member forms a latching tab; the second rotatable assembly further comprises a restricting module assembled on the fixed bracket, the restricting module comprises a first restricting member and a second restricting member; the second limiting member further forms a limiting protrusion; the limiting tab of the first limiting member abuts the first restricting member to prevent the pivot shaft from rotating further in a first direction; the limiting protrusion of the second limiting member abuts the second restricting member to prevent the pivot shaft from rotating further in a second direction.

7. The dual-axis hinge mechanism of claim 6, wherein the restricting module further comprises a pin; the first restricting member is fixed on the fixed bracket;
   the second restricting member is rotatably assembled on the fixed bracket by the pin; the first restricting member comprises a main body and a restricting portion thinner than the main body; the thickness difference between the main body and the restricting portion is larger than the thickness of the second restricting member, thus the second restricting member can be rotated into a gap defined between the restricting portion and the fixed bracket.

8. The dual-axis hinge mechanism of claim 7, wherein the restricting module further comprises a torsion spring non-rotatably sleeved on the pin; the second restricting member comprises two side walls; the torsion spring comprises a first latching portion and a second latching portion respectively abutting inner surfaces of the side walls of the second restricting member.

9. The dual-axis hinge mechanism of claim 6, wherein the second rotatable assembly further comprises a positioning member non-rotatably sleeved on the pivot shaft; the fixed bracket defines a positioning groove, the positioning member forms a positioning protrusion engaged in the positioning groove of the fixed bracket.

10. The dual-axis hinge mechanism of claim 6, wherein the rotatable bracket comprises a flat sheet, and a side sheet extending substantially perpendicularly from an end of the flat sheet; the flat sheet defines a mounting hole, the side sheet defines a assembling hole; the first rotatable assembly comprises a rotating shaft having a shaft head to be engaged in the assembling hole of the side sheet; the pivot shaft comprises a shaft head to be engaged in the mounting hole of the flat sheet.

11. The dual-axis hinge mechanism of claim 10, wherein the first rotatable assembly further comprises a connecting member and a rotating member rotatably sleeved on the rotating shaft; the connecting member defines an engaging groove, the rotating member forms an engaging protrusion engaged in the engaging groove of the connecting member.

12. The dual-axis hinge mechanism of claim 11, wherein the first rotatable assembly further comprises a stationary member non-rotatably sleeved on the rotating shaft; the rotating member defines a positioning groove in a side surface, the stationary member forms a positioning protrusion engaged in the positioning groove of the rotating member.

13. The dual-axis hinge mechanism of claim 10, wherein the first rotatable assembly further comprises a frictional piece, an elastic member, a flat washer sleeved on the rotating shaft, and a fastening member engaged on an end of the rotating shaft.

14. A dual-axis hinge mechanism, comprising:
a fixed bracket;
a pivot shaft rotatably extended through the fixed bracket;
a first limiting member rotatably sleeved on the pivot shaft, and the first limiting member forming a latching protrusion and a limiting tab;
a second limiting member non-rotatably sleeved on the pivot shaft, and the second limiting member forming a limiting protrusion and a latching tab; and
a restricting module assembled on the fixed bracket, the restricting module comprising a first restricting member and a second restricting member;
when the second limiting member being rotated a rotatable angle following the pivot shaft in a first direction, the latching tab abutting the limiting tab, thus driving the first limiting member to rotate together with the second limiting member, until the limiting tab abutting the first restricting member to prevent the pivot shaft from rotating further in the first direction;
when the second limiting member being rotated a rotatable angle following the pivot shaft in a second direction, the latching tab abutting the latching protrusion, thus driving the first limiting member to rotate with the second limiting member, until the limiting protrusion abutting the second restricting member to prevent the pivot shaft from rotating further in the second direction;
wherein the total of the rotatable angle of the second limiting member relative to the first limiting member and the rotatable angle of the first limiting member relative to the fixed bracket is 360 degrees.

15. The dual-axis hinge mechanism of claim 14, wherein the restricting module further comprises a pin; the first restricting member is fixed on the fixed bracket; the second restricting member is rotatably assembled on the fixed bracket by the pin; the first restricting member comprises a main body and a restricting portion thinner than the main body, the thickness difference between the main body and the restricting portion is larger than the thickness of the second restricting member, thus the second restricting member can be rotated into a gap defined between the restricting portion and the fixed bracket.

16. The dual-axis hinge mechanism of claim 15, wherein the restricting module further comprises a torsion spring non-rotatably sleeved on the pin; the second restricting member comprises two side walls; the torsion spring comprises a first latching portion and a second latching portion respectively abutting inner surfaces of the side walls of the second restricting member.

* * * * *